United States Patent

Park

[11] Patent Number: 6,050,704
[45] Date of Patent: Apr. 18, 2000

[54] LIQUID CRYSTAL DEVICE INCLUDING BACKLIGHT LAMPS HAVING DIFFERENT SPECTRAL CHARACTERISTICS FOR ADJUSTING DISPLAY COLOR AND METHOD OF ADJUSTING DISPLAY COLOR

[75] Inventor: Eui-yeul Park, Seoul, Rep. of Korea

[73] Assignee: Samsung Display Devices Co., Ltd., Kyungki-do, Rep. of Korea

[21] Appl. No.: 09/088,676

[22] Filed: Jun. 2, 1998

[30] Foreign Application Priority Data

Jun. 4, 1997 [KR] Rep. of Korea ............ 97-23126

[51] Int. Cl.[7] .................................. F21K 27/00
[52] U.S. Cl. ................. 362/260; 362/31; 362/26; 362/29; 362/30; 362/27; 362/84; 362/255; 362/318
[58] Field of Search ................... 362/31, 26, 29, 362/30, 27, 84, 255, 260, 318

[56] References Cited

U.S. PATENT DOCUMENTS

| | | | |
|---|---|---|---|
| 4,447,756 | 5/1984 | Kohmoto et al. | 313/487 |
| 4,950,053 | 8/1990 | Haim et al. | 362/31 |
| 5,008,789 | 4/1991 | Arai et al. | 362/255 |
| 5,057,974 | 10/1991 | Mizobe | 362/31 |
| 5,396,406 | 3/1995 | Ketchpel | 362/31 |

*Primary Examiner*—Sandra O'Shea
*Assistant Examiner*—Ronald E. DelGizzi
*Attorney, Agent, or Firm*—Leydig, Voit & Mayer, Ltd.

[57] ABSTRACT

A liquid crystal display (LCD) device including an LCD panel having liquid crystal cells, a color filter, and fluorescent lamps for back lighting located at a rear side of the LCD panel. The light generated by respective fluorescent lamps has different wavelength distributions. Thus, the color of the display can be easily and accurately adjusted by a user. Particularly, the color can be adjusted according to user's choice or circumstances, improving an image.

4 Claims, 5 Drawing Sheets

LIQUID CRYSTAL DEVICE INCLUDING BACKLIGHT LAMPS HAVING DIFFERENT SPECTRAL CHARACTERISTICS FOR ADJUSTING DISPLAY COLOR AND METHOD OF ADJUSTING DISPLAY COLOR

BACKGROUND OF THE INVENTION

1. Field of the Invention

The present invention relates to an a liquid crystal display (LCD) device and color adjustment thereof, and more particularly, to an LCD device having a plurality of lamps of different color coordinates for color adjustment and a color adjustment method.

2. Description of the Related Art

In general, there are various ways to display information using devices such as cathode ray tubes, utilizing light emission of thermions impacting a fluorescent substance, LCDs, plasma display panels, etc. Among those devices, the LCD device is currently widely used due to its many advantages such as that power consumption is low compared to other display devices, manufacture of diverse sizes is possible, a display pattern can be formed in many ways, low voltage operation is possible, and an interface with large scale integrated complementary metal oxide semiconductor circuits is very easy.

However, since the common LCD device is a light-reflecting light-emission device which forms an image by reflecting external light rather than by emitting light by itself, the image can not be viewed in a dark place. Thus, an illumination apparatus must be installed at the rear surface of the LCD device so that the image can be viewed in a dark place.

As the illumination lamp for the back light of the LCD device, a point light source such as a glow lamp, or a white light halogen lamp, a linear light source such as a fluorescent lamp (hot cathode or cold cathode), or a plane light source such as light emitting diodes in a matrix format may be used. The fluorescent lamp has mercury and rare gas sealed in a lamp. When the lamp discharges, the mercury emits ultraviolet rays which collide with a fluorescent substance coating the inside surface of the lamp tube, to emit visible light. The rare gas is mostly argon gas and the sealing is to control the speed of electrons during discharge and restrict sputtering of electrodes.

Back lights for LCD devices can be divided into edge types and downside types according to the arrangement of a light source. In the edge type, a fluorescent lamp, which is a linear light source, is arranged at the edge of a display surface, whereas in the downside type, one or a plurality of light sources are arranged underneath of the display surface.

FIGS. 1A and 1B are exploded perspective views of an LCD device having back lights of the downside type and edge type, respectively.

FIG. 1A shows a the to the downside type back light used when a high brightness is required as in a color LCD television. An LCD panel 13 has substrates facing each other and on which an electrode having a strip shape is formed. And liquid crystal fills the space between the substrates. A lamp 11 is disposed below the LCD panel 13 and light falling on a surface of the LCD panel 13 is made uniform by using a reflection plate 14 and a diffuser plate 15. The light generated from the lamp 11 is reflected by the reflection plate 14, diffused by the diffuser plate 15, and selectively transmitted through the LCD panel 13. An inverter 16 provides a voltage for illuminating the lamp 11.

FIG. 1B shows an edge type back light when uniformity of light is more valued than brightness. A lamp 14 is disposed at the edge of the LCD panel 13 and the light generated by the lamp 14 indirectly reaches the LCD panel 13 through a light transmitting plate 12 such as an acrylic resin. Here, the effect of the light transmitting plate 12 can be improved by attaching a diffuser plate and a reflection plate (not shown) on the upper and lower surfaces of the light transmitting plate 12. An inverter 16 provides a voltage for illuminating the lamp 11.

A color LCD device has a color filter. The color filter can be manufactured integrally with the LCD panel 13 shown in FIGS. 1A and 1B. The color filter is composed of pixels, each of which has filter elements of red (R), green (G), and blue (B) colors to transmit light of a particular wavelength range from the light of the back light passing through the liquid crystal cell. The liquid crystal in the liquid crystal cell is tilted at a predetermined angle by the application of a liquid crystal driving voltage. The light of the back light passes through one of the R, G, and B color filters according to the tilting of the crystal liquid, while passing through the liquid crystal cell. Light passing through the filter generates light of one color at each pixel, so that a plurality of pixels together embody color.

FIG. 2 is a graph showing relative light intensity of a fluorescent lamp for a back light and a color filter with respect to light transmission wavelength.

When light emitted from the fluorescent lamp back light is split, a wavelength peak occurs in an area corresponding to a wavelength range of a particular area which is selectively transmitted in the color filter. That is, a common fluorescent lamp for a back light is manufactured by coating with a fluorescent substance which is made by blending three sorts of rare-earth elements respectively emitting red (R), green (G), and blue (B). The light emitted from such a fluorescent lamp is white as a whole. The white light generated from the fluorescent lamp is selectively transmitted through the color filter so as to emit light of an arbitrary color. Here, if the white light is split, there occur a couple of peaks with respect to relative light intensity in the entire wavelength distribution which is coincident with a transmission area of the light transmitted by the R, G, and B filters formed on the color filter. Namely, as shown in FIG. 2, the peaks of light generated from the fluorescent lamp are at about 450 nm, 540 nm, and 610 nm, respectively, which correspond to the light transmission areas for the R, G and B colors. The areas where the peaks are formed in the wavelength distribution of the fluorescent lamp can be arbitrarily altered during manufacture of the fluorescent lamp.

According to the conventional technology, in order to adjust the color displayed in the LCD device, a fluorescent lamp having the desired color is installed. That is, by selecting the fluorescent substance coating the fluorescent lamp, a different lamp having altered peaks in the wavelength distribution is adopted as a back light. For instance, when an LCD device exhibiting a superior reemergence of blue color is to be manufactured, there is no alternative to installing a fluorescent lamp back light having a greater peak value in the wavelength distribution, particularly in the transmission wavelength area of a blue filter. However, since this method is performed only in the manufacturing process of the LCD device, there is no chance to involve a user. That is, a user can not arbitrarily adjust the color of the LCD device, so it is not possible to adjust the color to adapt to a change of circumstances while using the LCD device.

SUMMARY OF THE INVENTION

To solve the above problems, it is an objective of the present invention to provide an LCD device which allows an arbitrary adjustment of color.

It is another objective of the present invention to provide an LCD device having a plurality of back lights formed to have different peak values of wavelength.

It is still another objective of the present invention to provide a method of adjusting the color of an LCD device by changing a current applied to the back light.

Accordingly, to achieve the first and second objectives, there is provided an LCD device including an LCD panel having liquid crystal cells formed thereon and a color filter and a plurality of fluorescent lamps for a back light installed to the rear of the LCD panel such that light rays generated by the fluorescent lamps differ in their wavelength distributions.

It is preferable in the present invention that one of the plurality of fluorescent lamps for a back light is manufactured by blending three first rare-earth fluorescent substances emitting light rays of red (R), green (G), and blue (B) color and another fluorescent lamp is manufactured by selectively blending one or two rare-earth fluorescent substances emitting light rays of red (R), green (G), and blue (B), having a wavelength distribution the same as, or different from, that of the three first rare-earth fluorescent substances.

To achieve the third objective, there is provided a method for adjusting the color of an LCD device having an LCD panel having liquid crystal cells formed thereon and a color filter, and a plurality of fluorescent lamps for a back light installed to the rear of the LCD panel such that light rays generated from the fluorescent lamps differ in their wavelength distributions, wherein the color of light transmitted through the LCD panel is adjusted by independently changing the current applied to each of the plurality of fluorescent lamps for a back light.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Figure 1A:
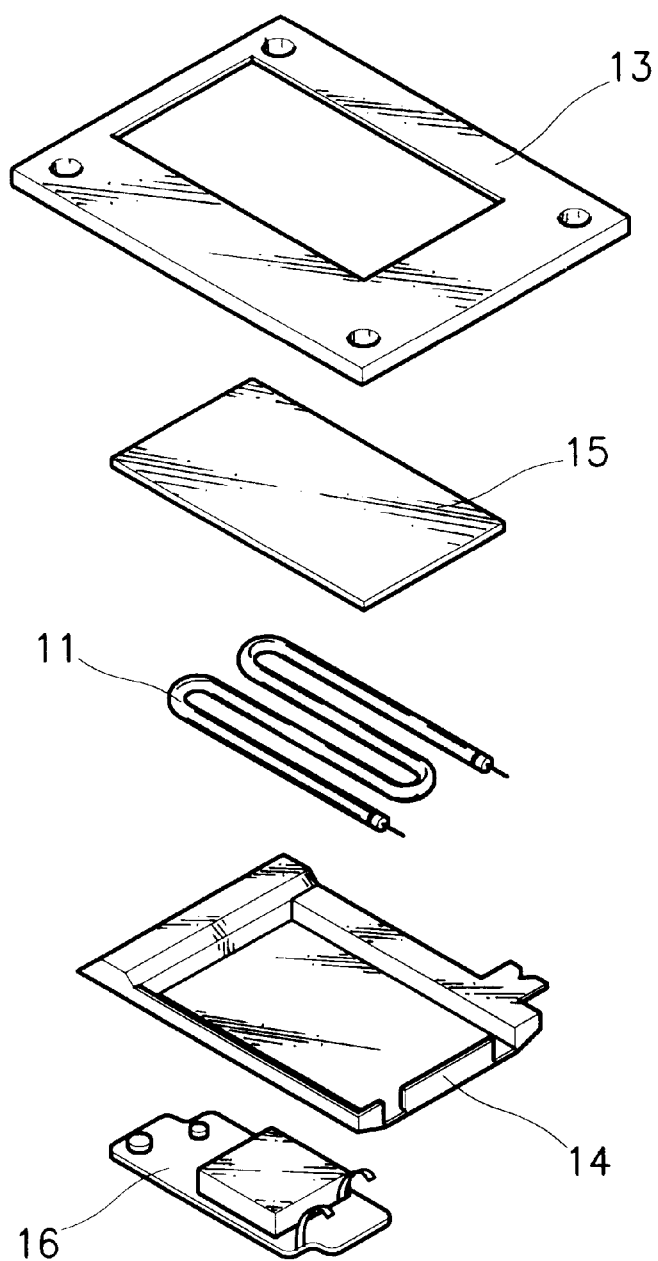
FIGS. 1A and 1B are exploded perspective views illustrating LCD devices according to the conventional technology.
Figure 1B:
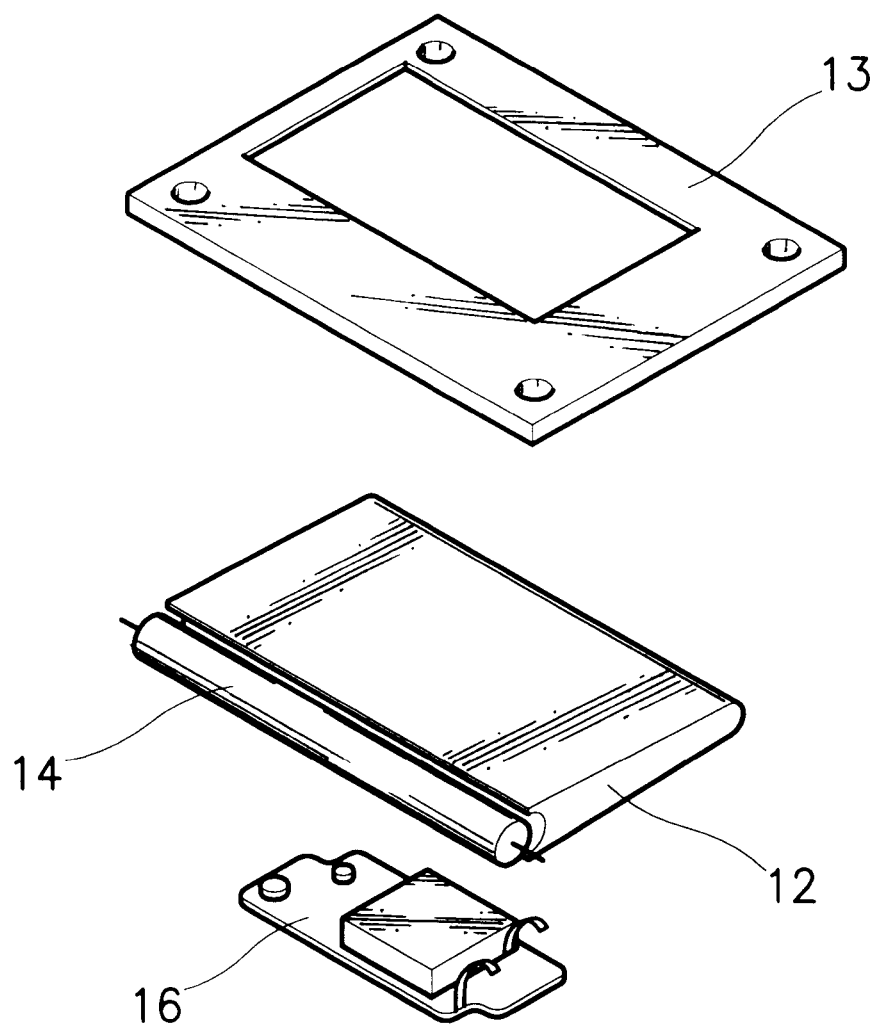
Figure 3:
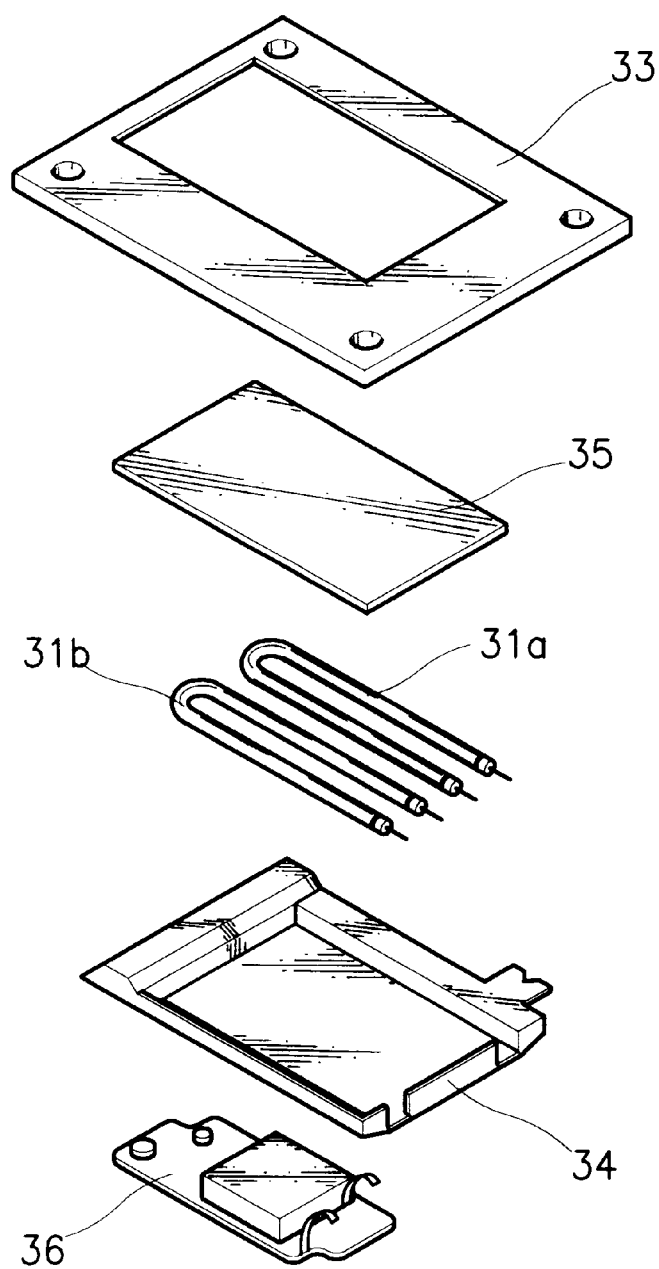
FIG. 3 is an exploded perspective view illustrating an LCD device according to a preferred embodiment of the present invention.

Referring to FIG. 3 showing a downside type LCD device, the structure of an LCD device according to a preferred embodiment of the present invention is similar overall to that shown in FIG. 1A. A liquid crystal cell and a color filter are formed on an LCD panel 33 and a diffuser plate 35 for diffusing light generated by a back light is installed thereunder. A reflection plate 34 for reflecting the light by the back light is installed under the back light. The light generated from the back light is selectively transmitted through the LCD panel 33 by interaction with the reflection plate 34 and the diffuser plate 35. The uniformity of the light can be increased by forming an unevenness on the diffuser plate 35, or by installing a sputtered aluminum film to change the distribution of the light. Reference numeral 36 indicates an inverter circuit device for applying a voltage to the back light.

According to the present invention, a plurality of back lights having different light wavelength distributions are used. In the embodiment shown in FIG. 3, two U-shaped fluorescent lamps 31a and 31b are included. In another embodiment, two or more fluorescent lamps can be installed and the shape thereof can be changed in various ways.

Figure 2:
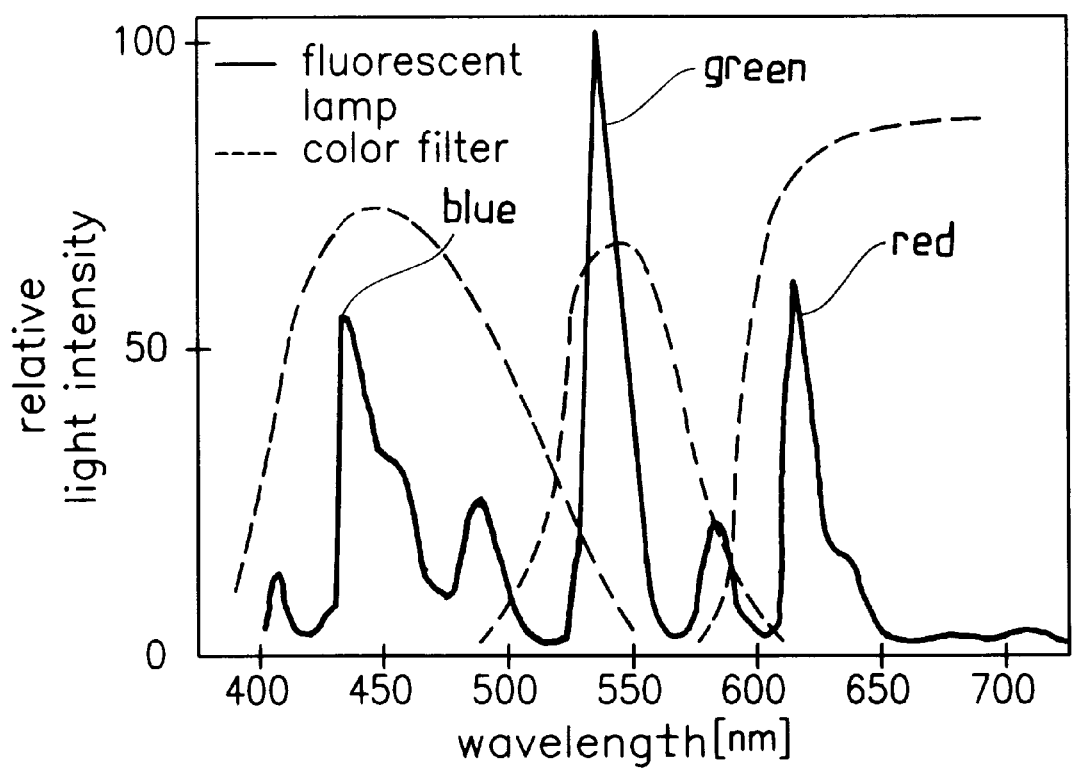
FIG. 2 is a graph showing the relationship between relative light intensity and wavelength with respect to the color filter and the fluorescent lamp.

When the light emitted from the fluorescent lamps 31a and 31b is represented as a spectrum, the distribution of wavelength of the light is formed differently. For instance, one fluorescent lamp 31a is manufactured by including a coating of rare-earth fluorescent substances having a normal wavelength distribution as shown in FIG. 2 and the other fluorescent lamp 31b is manufactured by including a coating of one or two fluorescent substances each of which has a wavelength distribution the same as or different from that of the coatings of the lamp 31a. For instance, when the fluorescent lamp 31b includes as a coating only a blue fluorescent substance, a user can appropriately adjust the color of the LCD device to have a superior reemergence of blue color. Namely, since brightness of light passing through a blue filter increases as current applied to the fluorescent lamp 31b is increased, the reemergence of blue becomes better than red or green.

In another embodiment, the fluorescent lamp 31b is manufactured by blending all three sorts of rare-earth fluorescent substances described above and the distribution of wavelengths is different. In such a case, by independently increasing or decreasing current applied to the respective fluorescent lamps 31a and 31b brightness of red, green, or blue colors can be adjusted and thus reemergence of a particular color can be adjusted as a user desires.

Figure 4:
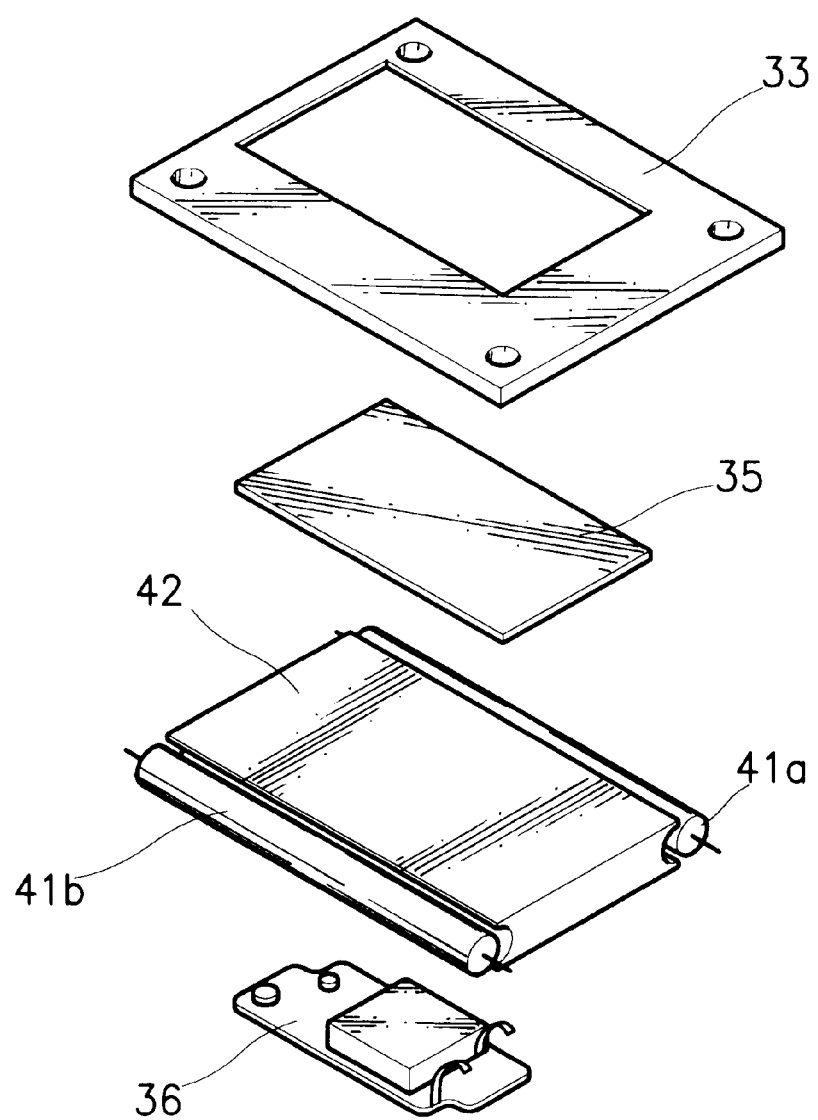
FIG. 4 is an exploded perspective view illustrating an LCD device according to another preferred embodiment of the present invention.

The adjustment of current for the respective fluorescent lamps can be performed by a well-known means, and the method and the adjustment can be preferably chosen by a user. For instance, an additional device for selecting one of various color adjustment modes is installed in an LCD device such that reemergence of color can vary based on the mode selected by the user. Also, as shown in FIG. 4, a plurality of lamps can be installed as an edge type back light for color adjustment. Here, reference numerals 41a and 41b denote fluorescent lamps for back lighting, including rare-earth fluorescent substances having different wavelength distributions, and reference numeral 42 denotes a diffuser plate.

As described above, according to the LCD device and a color adjustment method thereof according to the present invention, the color can be easily and accurately adjusted, and the adjustment can be performed by a user. Particularly, color can be adjusted according to user's favor or circumstances, thereby improving an image.

It is noted that the present invention is not limited to the preferred embodiment described above, and it is apparent that variations and modifications by those skilled in the art can be effected within the spirit and scope of the present invention defined in the appended claims.

What is claimed is:

1. A liquid crystal display (LCD) device comprising:
   an LCD panel having liquid crystal cells and a color filter; and
   a plurality of fluorescent lamps for back lighting said LCD panel and located at a rear side of said LCD panel, each of the fluorescent lamps producing light having respective different wavelength distributions whereby the spectral distribution of light produced by said fluorescent lamps and passing through said color filter may be altered by independently controlling said fluorescent lamps.

2. The LCD device as claimed in claim 1, wherein one of said plurality of fluorescent lamps includes a first blend of three rare-earth fluorescent substances respectively emitting red, green, and blue light and another of said fluorescent lamps includes a second blend of no more than two rare-earth fluorescent substances respectively emitting red, green, and blue light and producing light having a wavelength distribution different from the light produced by the first blend of three rare-earth fluorescent substances.

3. The LCD device as claimed in claim 1, wherein one of said plurality of fluorescent lamps includes a first blend of three rare-earth fluorescent substances respectively emitting red, green, and blue light and another of said fluorescent lamps includes a second blend of three rare-earth fluorescent substances respectively emitting red, green, and blue light and producing light having a wavelength distribution different from the wavelength distribution of light produced by said first blend of three rare-earth fluorescent substances.

4. A method for adjusting the color of a liquid crystal display (LCD) device having an LCD panel including liquid crystal cells and a color filter, and a plurality of fluorescent lamps for back lighting said LCD panel, located at a rear side of said LCD panel such, respective fluorescent lamps producing light having respective, different wavelength distributions, the method including adjusting the color of light transmitted through said LCD panel by independently changing the current supplied to each of said fluorescent lamps.

* * * * *